US005865308A

United States Patent [19]

Qin et al.

[11] Patent Number: 5,865,308

[45] **Date of Patent: *Feb. 2, 1999**

[54] SYSTEM, METHOD AND DEVICE FOR CONTROLLABLY RELEASING A PRODUCT

[75] Inventors: Chuan Qin, Gurnee; Yuanpang Samuel Ding, Vernon Hills; Chi Chen, Hawthorn Woods; Jerry Ripley, McHenry, all of Ill.

[73] Assignee: Baxter International Inc., Deerfield, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 739,243

[22] Filed: Oct. 29, 1996

[51] Int. Cl.[6] .......................... B65D 25/06; B65D 25/08; F16K 17/38; F16K 31/00

[52] U.S. Cl. .......................... 206/219; 220/201; 251/11; 137/81.1; 137/79

[58] Field of Search .................................... 206/219, 221, 206/222; 220/201; 251/11; 137/59, 62, 79, 81.1

[56] References Cited

U.S. PATENT DOCUMENTS

| | | | |
|---|---|---|---|
| 611,520 | 9/1898 | Smith | 206/221 |
| 2,371,774 | 3/1945 | Nosik . | |
| 2,549,417 | 4/1951 | Brown | 206/221 |
| 2,610,628 | 9/1952 | Lockhart | 206/221 |
| 4,396,383 | 8/1983 | Hart . | |
| 4,432,755 | 2/1984 | Pearson . | |
| 4,458,733 | 7/1984 | Lyons . | |
| 4,533,347 | 8/1985 | Deckert . | |
| 4,731,060 | 3/1988 | Catalano . | |
| 5,176,275 | 1/1993 | Bowie | 206/221 |
| 5,201,722 | 4/1993 | Moorehead et al. . | |
| 5,205,834 | 4/1993 | Moorehead et al. . | |
| 5,221,268 | 6/1993 | Barton et al. . | |
| 5,385,545 | 1/1995 | Kriesel et al. . | |
| 5,386,546 | 1/1995 | Kriesel et al. . | |

FOREIGN PATENT DOCUMENTS

| | | | |
|---|---|---|---|
| 0597111 | 5/1994 | European Pat. Off. . | |
| 1274643 | 9/1961 | France | 206/221 |
| 482319 | 4/1992 | Germany | 206/221 |
| 9504689 | 2/1995 | WIPO . | |
| 9532130 | 11/1995 | WIPO . | |
| 9624542 | 8/1996 | WIPO . | |

*Primary Examiner*—Paul T. Sewell
*Assistant Examiner*—Anthony Stashick
*Attorney, Agent, or Firm*—Thomas S. Borecki; Charles R. Mattenson; Robert M. Barrett

[57] ABSTRACT

A device, a system and a method are provided for controllably releasing a product (26) into a container (10) in which the product (26) is mixed with another product contained within an interior (14) of the container 10. The device (12) releases the product (26) due to variations in temperature or pressure that the system experiences during an autoclaving or sterilization procedure, for example. Materials and shapes of the members (20, 20*a*, 20*b*, 22) of the device (12) are selected such that the members (20, 20*a*, 20*b*, 22) react or otherwise move within the device in a predetermined manner in response to changes in temperature or pressure. As a result, products (26) within the device (12) may be maintained separately from products within the interior (14) of the container (10) in which the device (12) is held. Prior to administration of a solution within the container (10), the product (26) within the device (12) may be mixed with the solution or other product in the container (10) in a controllable fashion.

13 Claims, 6 Drawing Sheets

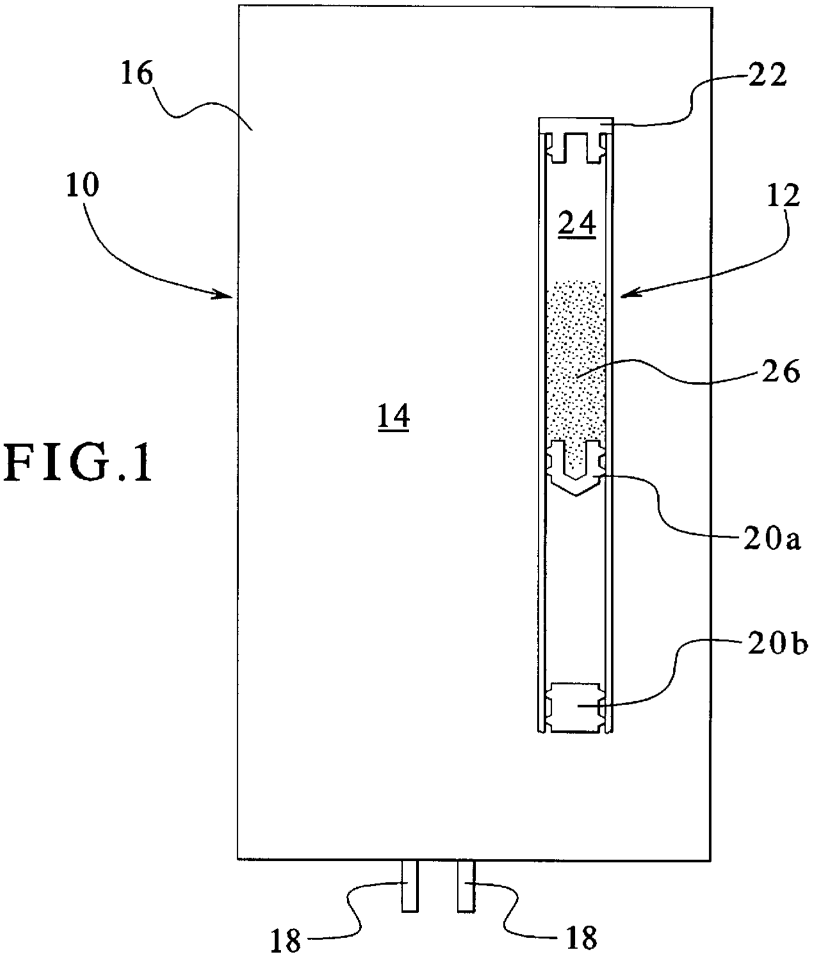
FIG.1
FIG.2
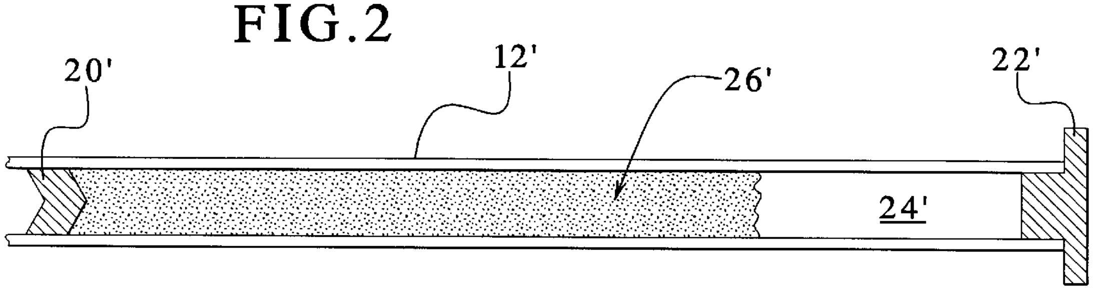

SYSTEM, METHOD AND DEVICE FOR CONTROLLABLY RELEASING A PRODUCT

BACKGROUND OF THE INVENTION

The present invention generally relates to a valve used in a system for release of a product into the system following occurrence of an event. More specifically, the present invention relates to a valve, a system and a method for controllable release of a product which requires separation from a remainder of the products contained in a system.

A major function of a kidney is to maintain an acid-based homeostasis in the body. A patient requiring renal dialysis relies on a buffer provided in a dialysate for this function. A natural buffer which is present in the body is a bicarbonate buffer. Therefore, using a bicarbonate buffer is a natural choice for combination with a dialysate. However, bicarbonate when mixed with dextrose contained in dialysate causes the dextrose to degrade at the high temperatures that are used during autoclaving. Therefore, lactate has often been used as a substitute for bicarbonate.

Solution biocompatability is, of course, a major concern in dialysis. Therefore, combining dialysate with a bicarbonate buffer has been seriously pursued. Accordingly, many endeavors have been undertaken to develop a bicarbonate solution for use in dialysis.

One such known method is to incorporate a dual-chamber bag. In this system and method, two solutions are contained in two separate chambers of a bag that are integrally formed. Between the chambers of the bag is a frangible. When the frangible is broken, the two solutions are admixed. However, such a system is difficult to manufacture, and the material costs required to produce the dual-chamber bag are high.

Of course, a number of other applications require separation of components prior to use due to compatability issues. For example, a number of intravenous solutions require separation, such as dextrose and heparin, chemotherapy drugs and antibiotic drugs. Other peritoneal dialysis solutions also require separation besides dextrose and a buffer, such as polyglucose and a buffer; dextrose or polyglucose and a peptide or amino acids; and Dianeal® and heparin.

A need, therefore, exists for an improved device, system and method for controllably releasing a component, such as bicarbonate, into a solution or second component for mixing of the component with the solution.

SUMMARY OF THE INVENTION

The present invention relates to a device, a system and a method for controllably releasing a component. The device of the present invention sealingly holds the component until a predetermined event, such as a change, in an external condition, occurs causing release of the component into another container having a solution therein. As a result, the component is mixed with the solution.

To this end, in an embodiment, the present invention provides a system for controlling release of a component. The system has a container having walls defining an interior capable of holding a product therein wherein the product requires mixture with the component. A device exposed to the interior of the container has walls defining an interior. A plug member encloses the interior wherein the interior holds the component for mixing with the product in the container.

In an embodiment, the plug member is constructed from material designed to alter its shape due to changes in temperature.

In an embodiment, the plug member is designed in a shape to alter position of the plug member in the device due to variations in pressure.

In an embodiment, a cap member encloses an end of the device remote from the plug member. A second plug member may be located intermediate the cap member and the plug member in the interior of the device. The second plug member may be designed in a shape that alters its position in the device due to variations in pressure.

In an embodiment, the component is a buffer used in a dialysis procedure.

In an embodiment, the product is a solution including dextrose.

In another embodiment of the present invention, a method is provided for controlling release of an agent. The method comprises the steps of: providing a container having an interior capable of holding a product therein; filling a device with the agent; sealing the agent in the device; providing the device in the interior of the container; altering a condition that is applied to the container; and releasing the agent from the device due to the altered condition.

In an embodiment, a plug member is provided sized to seal and enclose one end of the device wherein the plug member is responsive to changes in temperature.

In an embodiment, a plug member is provided sized to seal and enclose one end of the device wherein the plug member is responsive to changes in pressure.

In an embodiment, the agent is a buffer requiring mixture with the product for use in a dialysis procedure.

In an embodiment, the product is a solution having dextrose therein.

In an embodiment, the temperature is increased to subject the container to sterilization.

In another embodiment of the present invention, a device is provided having an agent therein for controllable release of the agent into a system. The device has a wall defining an interior that is accessible via an open end wherein the interior holds the agent. Further, a cap member is sized to seal and enclose the open end wherein the agent is enclosed and sealed in the interior and further wherein the cap member is responsive to a change in an external condition causing alteration of the cap member to release the agent.

In an embodiment, a plug member is located remotely from the cap member wherein the plug member is responsive to the change in the external condition. The cap member and the plug member are shaped to respond to changes in pressure. The cap member and the plug member may further be distinctly shaped from each other.

In an embodiment, the cap member has a core and a shell each made of distinct materials wherein each material reacts differently in changing temperature conditions.

In an embodiment, the agent is a buffer requiring mixture with a solution prior to administration to a patient undergoing a dialysis procedure.

In an embodiment, the external condition is varying pressure.

In an embodiment, the external condition is varying temperature.

In an embodiment, the wall has an integrally formed surface directed to the interior.

It is, therefore, an advantage of the present invention to provide a device, a system and a method for separating at least two components.

Another advantage of the present invention is to provide a device, a system and a method for simplifying separation of at least two components.

Yet another advantage of the present invention is to provide a device, a system and a method for controllably releasing a component into another component.

A still further advantage of the present invention is to provide a cost effective device, system and method for separating at least two components and controllably releasing at least one component into another component.

Moreover, an advantage of the present invention is to provide a device, a system and a method that automatically releases one component into another component during normal use of the system.

And, another advantage of the present invention is to provide a device, a system and a method that reliably maintains separation between at least two components and also reliably controls release of one component into at least one other component.

Yet another advantage of the present invention is to provide a device, a system and a method for controllably releasing a component into another component that is simple for a customer to use.

A still further advantage of the present invention is to provide a device, a system and a method for controllably releasing a component that is inexpensive to manufacture and to implement.

Additional features and advantages of the present invention are described in, and will be apparent from, the detailed description of the presently preferred embodiments and from the drawings.

BRIEF DESCRIPTION OF THE DRAWINGS

FIG. 1 illustrates a plan view of an embodiment of a solution container having a controllable release device therein in an embodiment of the present invention.

FIG. 2 illustrates a plan view of an embodiment of a controllable release device of the present invention.

DETAILED DESCRIPTION OF THE PRESENTLY PREFERRED EMBODIMENTS

Figure 3:
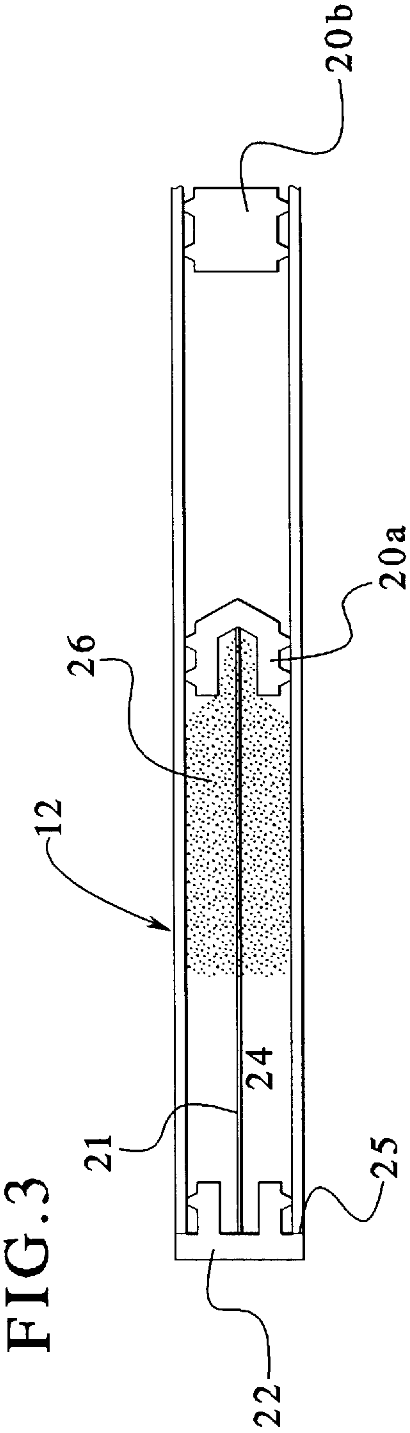
FIG. 3 illustrates an alternate embodiment of a controllable release device in a first position in an embodiment of the present invention.

The present invention generally relates to a controllable release valve or device, a system and a method for controllably releasing a product into another product. The system is particularly applicable for use in controllably releasing a component into a noncompatible component prior to use of the combined components. Such a system is particularly useful in a dialysis procedure wherein a device is provided containing sodium bicarbonate which must be maintained separately from a solution containing dextrose as sodium bicarbonate causes degradation of dextrose at high temperatures.

Referring now to the drawings wherein like numerals refer to like parts, FIG. 1 generally illustrates a container 10 having a device 12 of the present invention therein. The container 10 has an interior 14 formed by exterior walls 16. Typically, the walls 16 of the container are a thermoplastic material, but any material for the walls 16 are within the scope of the present invention. The interior 14 of the container 10 is capable of holding a solution or other component therein.

The device 12, as illustrated, is loosely suspended within the interior 14 of the container 10. However, it should be appreciated that the device 12 may be attached by a hanging mechanism (not shown) such that the device 12 is removably held in the interior 14 of the container 10. The container 10, as illustrated, includes two ports 18 providing fluid communication with the interior 14 of the container 10. Of course, a single port 18 or additional ports may be provided as required for the particular embodiment in which the invention is used.

Figure 4:
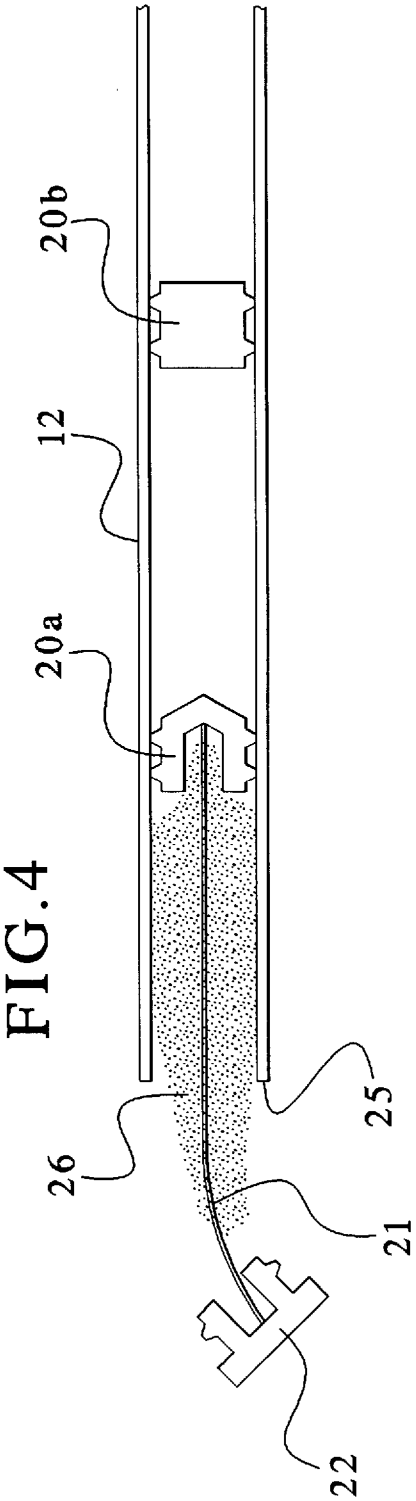
FIG. 4 illustrates a plan view of an alternate embodiment of the controllable release device of FIG. 3 in a second position in an embodiment of the present invention.
Figure 5:
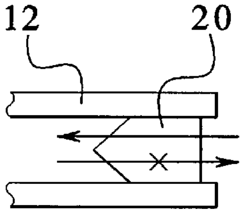
FIG. 5 illustrates a cross-sectional view of an embodiment of a plug member as used in a device in an embodiment of present invention.
Figure 6:
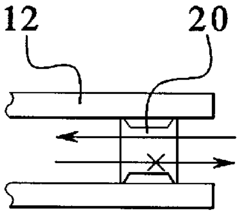
FIG. 6 illustrates a cross-sectional view of another embodiment of a plug member as used in a device in an embodiment of the present invention.
Figure 7:
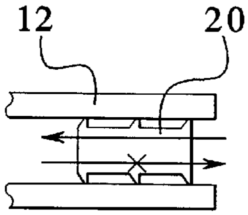
FIG. 7 illustrates a cross-sectional view of yet another embodiment of a plug member used in a device in an embodiment of the present invention.
Figure 8:
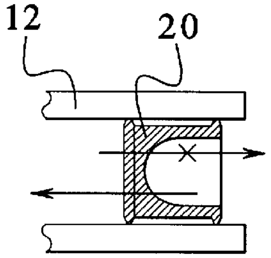
FIG. 8 illustrates a cross-sectional view of yet another embodiment of a plug member used in a device in an embodiment of the present invention.
Figure 9:
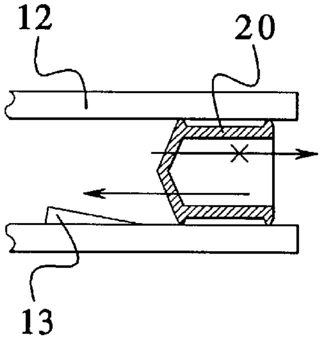
FIG. 9 illustrates a cross-sectional view of yet another embodiment of a plug member used in a device in an embodiment of the present invention.

The device 12, as illustrated in FIG. 1, is a hydrostatic valve designed with two plug members 20*a*, 20*b* and a cap member 22. The plug members 20*a*, 20*b*, as illustrated, are designed having distinct shapes such that each operates slightly different under varying temperature and/or pressure conditions. Of course, it should be appreciated that a single plug 20' may also be implemented as will be described with reference to FIG. 2 or, alternatively, additional plugs may also be implemented. The plug members 20*a*, 20*b* may also be identically shaped for a particular application in which the same may be appropriate. In addition, the cap member 22 may be connected to the plug member 20*a* such that when the cap member 22 is forced from the device 12, as illustrated in FIG. 4, the cap member 22 does not randomly release into the interior 14 of the container 10. To this end, a connecting member 21 may be provided that maintains the cap member 22 in spaced relation to the plug member 20*a*.

The device 12 has an interior section 24 in which a product 26, such as, for example, a buffer, may be stored prior to admixture with a component in the interior 14 of the container 10. During manufacture, the device 12 containing the product 26 may be inserted into the container 10 during a container forming process. The container 10 is then filled with a solution in the interior 14 of the container 10 containing all of the necessary ingredients required for a procedure, such as peritoneal dialysis. As previously mentioned, the device 12 may be floating or fixed within the interior 14 of the container 10.

The product 26, either in solid or in liquid form, is, therefore, sealed inside the device 12 and isolated from the bulk of the solution within the interior 14 of the container 10. The container 10 may then be separately pouched in an overpouch as required for the particular application. The container 10, with or without the overpouch, may then be autoclaved or heat sterilized as required.

During a sterilization procedure, the dynamics of the device 12 takes place. To prevent the container from exploding, an overpressure is required within an autoclave chamber in a standard autoclave cycle during which time the temperature within the chamber is raised. The overpressure compresses the device 12 thereby pushing the plug members 20*a*, 20*b* toward the cap member 22. Under compression, the seal is maintained between a product 26 and the solution in the interior 14 of the container 10.

At the completion of the cycle, pressure drops after the chamber is cooled off. When chamber pressure decreases, pressure inside the device 12 becomes greater than an exterior pressure. Then, internal pressure within the interior section 24 of the device 12 becomes so strong so as to push off the cap member 22 and release the product 26 into the interior 14 of the container 10 to mix with the solution contained therein. The admixing thereby occurs automatically at a cooler temperature, and the interaction between the product 26 and the solution is prevented during heat sterilization or the autoclave cycle in which it is not possible to mix the solution in the interior 14 of the container 10 with the product 26 in the interior section 24 of the device 12.

The above-described process is clearly illustrated with reference to the graph of FIG. 13. As shown from the graph, the plug member and cap member react due to changes in pressure conditions in the system during the autoclave cycle. In addition, the plug member 20*b* is designed such that the friction with the walls of the device exceeds the friction from the cap member 22 containing the product 26 and any additional plug members between the cap member and the most extreme plug member 20*a*. In addition, both the plug member and the cap member may be designed as one way plugs such that movement of the plug members and the cap member only occurs in a single direction.

Figure 13:
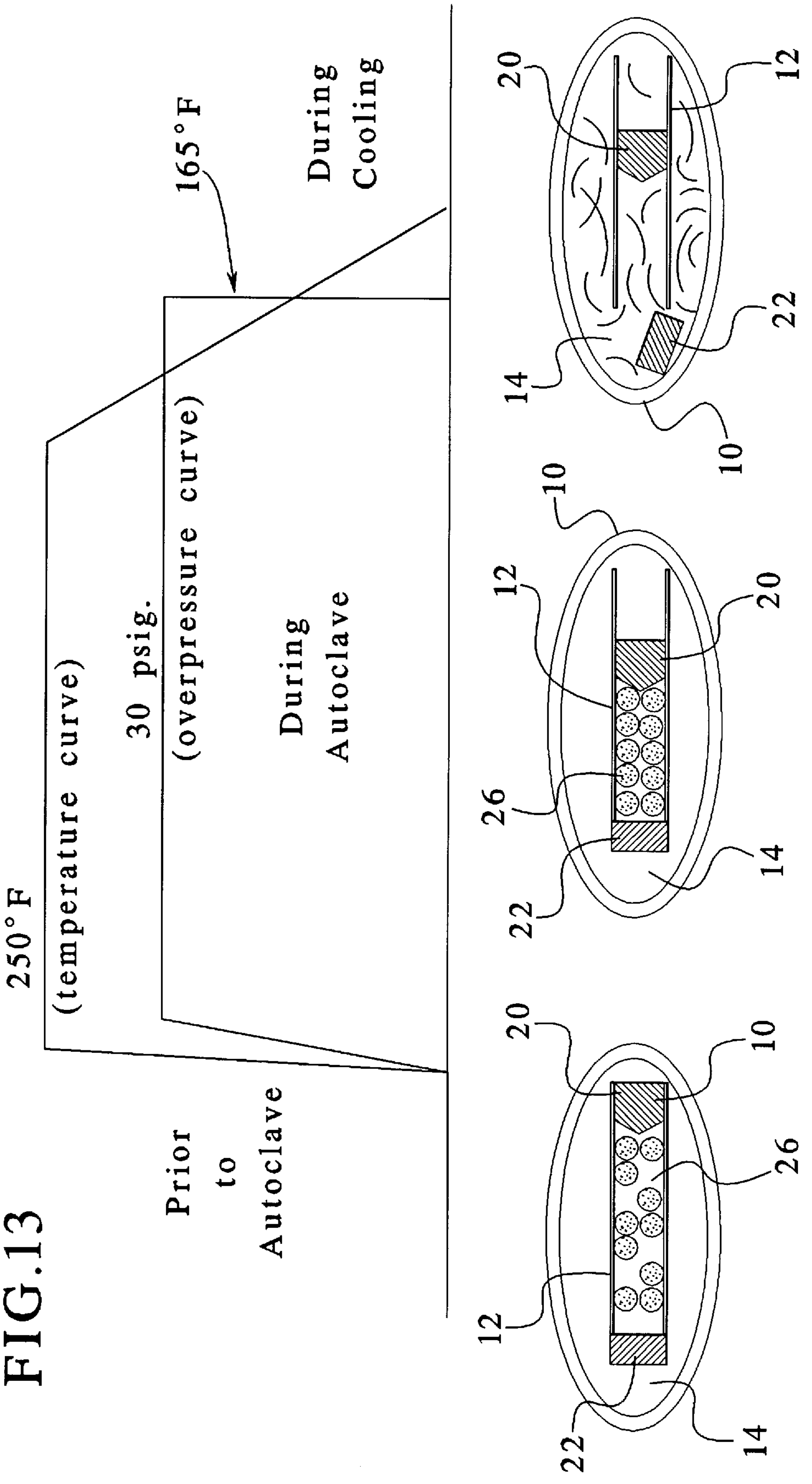
FIG. 13 illustrates a graph demonstrating the effect of temperature and pressure in an embodiment of the system of the present invention.

Referring again to the graph of FIG. 13, two separate activations are required in order for the cap member 22 to be removed from the device 12. Namely, during the autoclave cycle, when external pressure is large, the plug member 20 is pushed inward into the device 12. During cooling, the internal pressure becomes greater forcing the cap member 22 to pop out thereby releasing the component 26 contained in the device 22. The component 26 is thereby released into the interior 14 of the container 10. As previously mentioned, the plug member 20 and the cap member 22 may be connected such that the cap member 22 does not stray from the device 12 in the interior 14 of the container 10.

In a preferred embodiment, the plug and cap members 20*a*, 20*b* and 22, 20*b* are made from silicon elastomer. Using the additional plug member 20*a* at a middle point of the device 12, both of the plug members 20*a*, 20*b* move toward the cap member 22 the same way as one plug member moves within the device 12. With the additional plug member 20*a*, a better seal may be achieved and a physical push to cap member 22 can be generated.

Referring now to FIG. 2, a single plug member 20' is shown within a device 12' with a cap member 22' enclosing an interior section 24' in which a product 26' is sealed therein. The device operates in a similar manner as the two plug member design except that an extra plug member is not provided to maintain the integrity of the seal. In a preferred embodiment, the plug member may be constructed from a polyvinylchloride (PVC) material. Of course, other materials may be implemented by those skilled in the art.

FIGS. 3 and 4 illustrate the device 12 as described with reference to FIG. 1 incorporating the dual plug members 20*a*, 20*b* within the interior 24 of the device 12. Again, a single cap 22 encloses the interior of the container and is constructed such that a seal is maintained between an end 25 of the device 12 maintaining the product 26 within the interior section 24 of the device 12. During cooling of the device, pressure inside the device 12 becomes stronger thereby forcing removal of the cap member 22 from the end 25 of the device 12 and thereby allowing the product 26 to escape from the device 12. As previously stated, the plug member 20 also advances within the interior 24 of the device 12 maintaining the integrity of the seal from an opposite end of the cap member 22.

The hydrostatic valve design shown and described in FIGS. 2–4 and further shown and described with reference to FIGS. 5–10 is designed for processes which undergo pressure difference cycles, such as, for example, autoclave sterilization cycles under overpressure conditions. The activation member for opening the valve or plug member 20 or the cap member 22 is the volume expansion of air by pressure differences. The device 12 as previously described including the cap member 22 is designed to be incapable of moving into the device 12 under high external pressure, but opens under high internal pressure. The moving part or plug member 20, 20*a* and/or 20*b* is designed such that the plug member only moves within the device 12 under high external pressure but does not move out as easily as the cap member during high internal pressure. In addition, as previously described, the plug member 20 and the cap member 22 are designed such that the friction in the most distant plug member from the cap member exceeds the friction of the other plug members, if any, and the cap member 22.

Further, friction forces between the walls of the device 12 and the plug member 20, 20*a* and/or 20*b* and the cap member 22 are critical since the friction forces dominate both compression and expansion processes, i.e. less friction force for the cap member 22 (at least less than the expansion force on the cap member 22) and a higher friction force for the plug member 20, 20*a* and/or 20*b* during the opening process. A higher friction force is required for the cap member 22 and a lesser friction force is required for the plug member 20, 20*a* and/or 20*b* during a compression process. The friction forces can be controlled by a proper choice of material and the specific designs of the plug member 20, 20*a* and/or 20*b* and the cap member 22. The interfacial friction forces also contribute to the degree of sealing between the walls of the device 12 and the plug member 20, 20*a* and/or 20*b* and the cap member 22.

As illustrated in FIGS. 5–9, different design shapes of the plug members 20 are illustrated, either for the single plug design or the double plug design. The shape of the plug member 20 is designed for easy opening of the hydrostatic valves. For some products 26 contained in the device 12, for example, certain drugs, their dissolution rate in water is controlled by device shapes and wetability which dictate the contact between water and drugs. The improvement in surface hydrophilicity of the device 12 should be helpful to dissolve the contained drug into water by increasing the contact area between water and the drugs. Some surface modification treatments have been employed for this purpose, such as plasma treatment of the surfaces of the device 12; inorganic acid treatment of internal surfaces of the device 12; blending a water-soluble polymer into shell materials to improve surface wetability; and coextruding a hydrophilic layer on the internal surface of the devices. These surface treatments improve the surface hydrophilicity.

As illustrated in FIGS. 5–9, the different designs of the plug member 20 allow movement of the plug member 20 within the device 12 in the direction of the arrow, but not in the direction of the oppositely directed arrow having an "X" therethrough. As further illustrated in FIG. 9, an interior wall of the device 12 may be formed with a ramp 13. The ramp 13 may be integrally formed and is designed as a stopping member, i.e. to stop back-off or return of the plug member 20 in the device 12 during external pressure releasing. Of course, any of the other embodiments of the device 12 may also implement the ramp 13. The ramp 13, however, may simply be replaced by an indent or deformation formed in the wall of the device 12.

Figure 10:
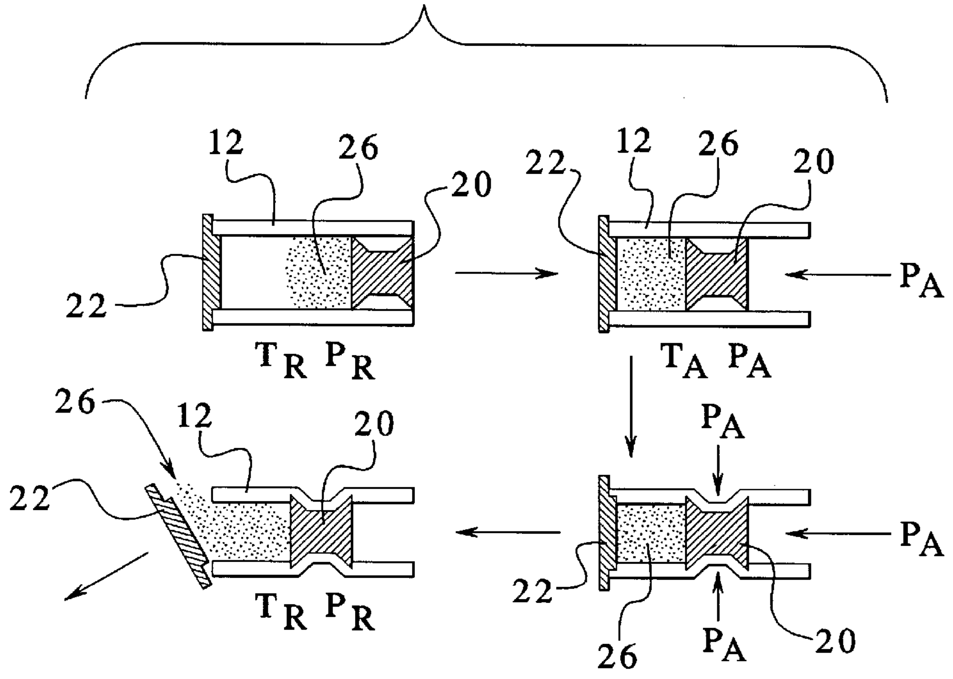
FIG. 10 illustrates a cross-sectional view of a process for controllably releasing material from a device in an embodiment of the present invention.

FIG. 10 illustrates the effects of both pressure and temperature within the device 12 to the cap member 22 and the plug member 20. The process of movement of the plug member 20 and subsequent movement of the cap member 22 from changing pressure conditions has been previously described with reference to FIGS. 1–4. In FIG. 10, the construction of the wall of the device 12 is also designed to collapse during changes in pressure and temperature conditions. As a result, with the plug member 20 designed as shown in FIG. 10, the wall of the device 12 collapses to affix the plug member 20 in the device 12 thereby limiting any further movement.

Figure 11:
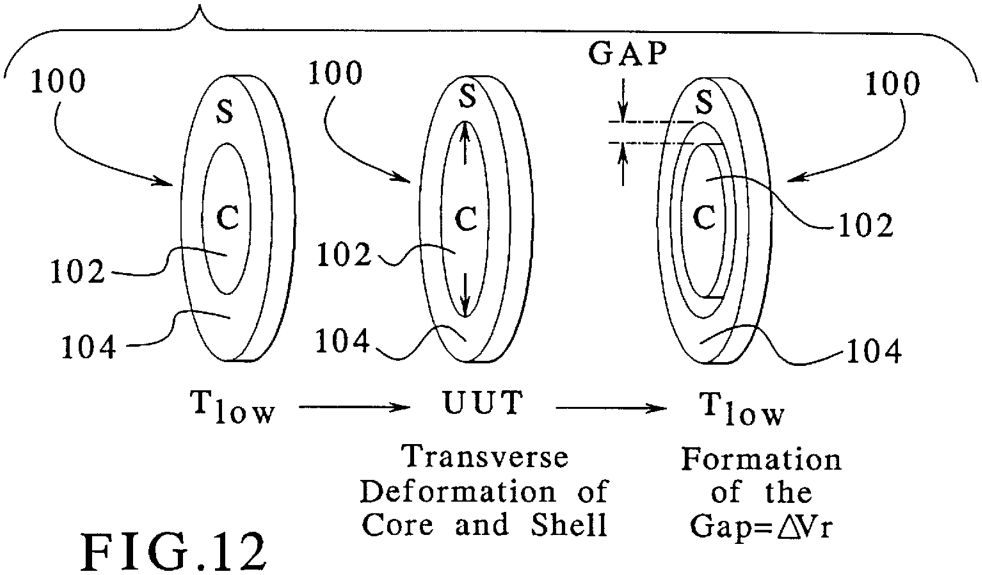
FIG. 11 illustrates a perspective view showing a process for forming a gap in another embodiment of a valve member for a device in an embodiment of the present invention.
Figure 12:
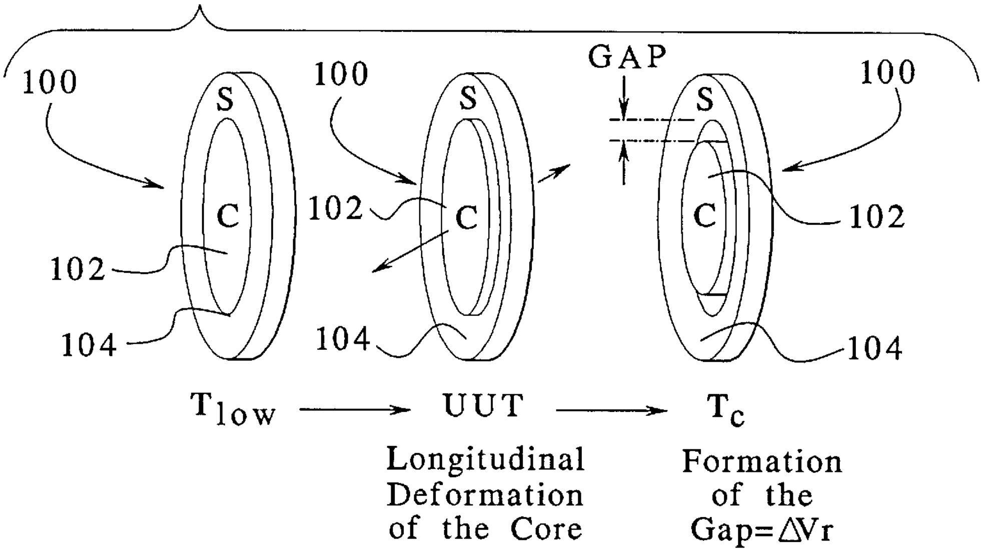
FIG. 12 illustrates a perspective view showing a process for forming a gap in yet another embodiment of a valve member for a device in an embodiment of the present invention.

Referring now to FIGS. 11 and 12, alternate embodiments to the embodiments illustrated in FIGS. 1–10 are shown. In FIGS. 11 and 12, a thermal valve 100 is illustrated. The thermal valve 100 operates under the principles governed by thermal expansion and contraction between polymer materials during heating and cooling cycles and the different swelling capabilities of polymers in an aqueous environment. The differences in thermal expansion or water swelling between two polymers can generate a significant gap during the heating and cooling cycles from a proper choice of materials for the members of the thermal valve device 100. Proper materials allow a separation or opening of the thermal valve 100 under a small driving force, such as gravity, for example.

FIGS. 11 and 12 illustrate an example of a thermal valve 100 with the thermal expansion/contraction of different kinds of polymer materials. With the change in polymer structure and morphology, a variety of transition behaviors can be used to generate a volume difference during heating and cooling cycles thereby creating a gap between the various materials. As illustrated, two distinct materials form a core 102 and a shell 104.

In a first example, as illustrated in FIG. 11, shell material transverse deformation results from selection of a shell material of a polymer having a low thermal expansion polymer and a lower mechanical strength against deformation at ultimate use temperature (UUT) as well as a lower water swelling capability. A core polymer is selected having a high thermal expansion polymer, a high elastic modulus, thermoset, high water swelling capability, melting temperature ($T_m$) or glass transmit temperature ($T_g$) less than UUT and a higher mechanical strength than the polymer of the shell 104 at UUT.

In another example illustrated in FIG. 12, a core material is subjected to longitudinal deformation. A polymer is selected for the shell 104 of a low thermal expansion polymer: that is, $T_g$ or $T_m$ is greater than the UUT and has enough mechanical strength at UUT. The polymer of the core material is a high thermal expansion polymer with $T_g$ or $T_m$ less than UUT. As a result, a gap is formed between the edge of the core member and an internal radius of the shell member 104 as shown in FIG. 12.

As a result of the selection of the proper polymers, a gap is created between the shell 104 and the core 102. The kind and size of the gap can be theoretically predicted by a calculation based on thermal expansion and contraction behavior of specific polymers.

EXAMPLE 1

Figure 15:
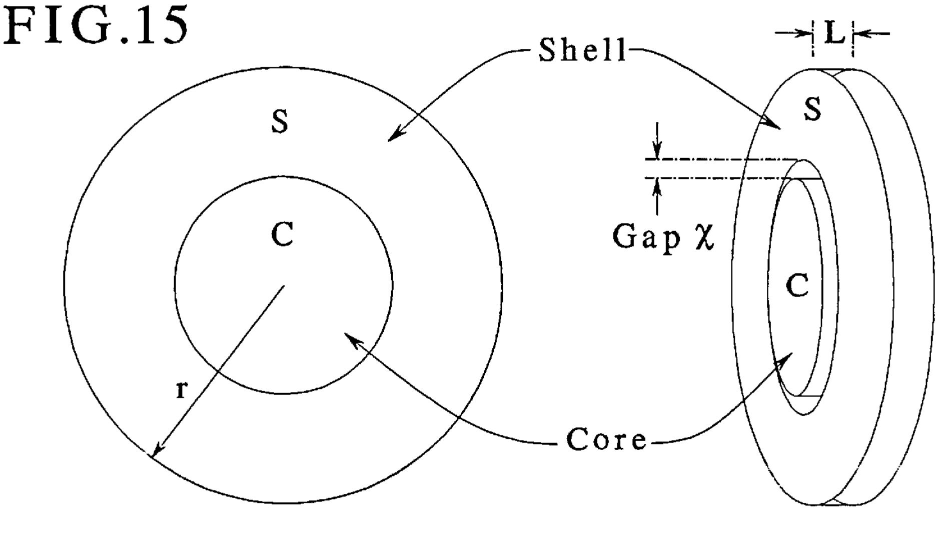
FIG. 15 illustrates a schematic diagram of an embodiment of a thermal valve device of the present invention.

The shell material (polymer S) is assumed to be polypropylene (PP, $T_m$>150° C.), and the core material (polymer C) is a linear low density polyethylene (LLDPE, $T_m$<120° C.). The UUT is assumed to be 120° C. according to normal autoclave temperature. Therefore, the $(T_m)_{LLDPE}$<UUT<$T_m$ PP condition can be satisfied. The thermal expansion coefficients for PP and LLDPE within the temperature range of 25°–120° C. are similar (about $10^{-4}$) since this temperature range is far higher than their $T_g$'S. It can be reasonably assumed that the volume difference due to thermal expansion may be ignored in this circumstance. That is, the volume difference necessary to generate a thermal gap is solely dependent from crystallization/melting transition of LLDPE. With heating from 25° C. to 120° C., LLDPE undergoes a melting transition but PP does not. Hence, LLDPE has a dramatic volume expansion by the change of crystalline phase to amorphous phase. With cooling from 120° C. to 25° C., LLDPE undergoes a crystallization transition but PP does not. Thus, LLDPE has a dramatic volume contraction by changing from an amorphous phase to a crystalline phase. And, a gap is created by the volume change of LLDPE during heating/cooling cycles due to a relatively constant volume of PP during this heating/cooling cycle, i.e. a longitudinal deformation of LLDPE producing a thermal gap. The following calculation gives a quantitative estimation of the size of the gap. A schematic presentation of a thermal valve device is used in the calculation as illustrated in FIG. 15, where L is the longitudinal thickness of the device, which is the same for the shell and the core, 3.0 mm is used in this case; r is the diameter of the valve, 73 mm is used in this case; x is the gap distance. The densities of crystalline PE and amorphous PE are 1.0 and 0.855, respectively. The crystallinity ($X_c$) of LLDPE is reasonably cited as 40 wt. %. The core materials (LLDPE) weight is assumed to be 0.11 gram. Therefore, the amorphous volume (Va) and crystalline volume (Vc) of PE can be calculated as:

$$Va=0.11/0.855=0.1287\ cm^3,$$

and $$Vc=0.11/1.0=0.1100\ cm^3.$$

The volume difference between Va and Vc is then:

$$V=Va-Vc=0.0187\ cm^3$$

For $X_c$=40 wt. %, the volume of semicrystalline LLDPE can be calculated as:

$$Vc+a=X_cVc+(1-X_c)\ Va=0.1212\ cm^3.$$

Thus, the volume difference between Va+c and Va, which is the total volume to be used to create a thermal gap, is calculated as:

$$Vr=Va-Va+c+0.007507\ cm^3=7.753\ mm^3.$$

The following equation is then obtained:

$$Vr=r^2L-(r-X)^2L$$

where Vr=7.753 $mm^3$, t=7.40 mm, L=4.00 mm. Then, the gap distance x which is generated by heating/cooling cycle can be calculated as 0.055 mm under assumed conditions. This gap is believed to be large enough for the thermal valve opening gravity force.

The material selected for use with the thermal valve may be classified into two different kinds:

(1) Material matches which can generate core material longitudinal deformation; the polymer of the shell material may be any of the following:

Polymer S: PP, PS SAN, PMMA, Nylon polyimids, PC, polysulfones, PCCE, $PVF_2$, Taflon, High T polyesters, their blends, and those polymers whose $T_g$ or $T_m$ is higher than UUT (for autoclave cycle, UUT is 120° C.).

The polymer of the core material may be any of the following:

Polymer C: crosslinked PE, low $T_m$ polyesters, polyethers, isonomers, rubbers, their blends, and those polymers whose $T_g$ or $T_m$ is lower than UUT (or autoclave cycle UUT is 120° C.).

The material matches create shell material transfer deformation wherein polymers of the shell material may be any of the following:

Polymer S: PE/PP blends, crosslinked PE, PS, their blends, and those polymers which have low thermal expansion, high permanent set, low mechanical strength against deformation at UUT, low water swelling capability.

And the polymer of the core material may be any of the following:

Polymer C: crosslinked rubbers, PU, other synthetic elastomers, hydrogels, EVOH, their blends, and those polymers which have high thermal expansion, high elastic modulus, high water swelling capability at UUT.

Referring to FIGS. 14(A)–(I), various embodiments of hydrostatic and thermal valves are illustrated. FIGS. 14(A), 14(C), 14(D), 14(F) and 14(I) illustrate various core (C) and shell (S) embodiments in which the thermal valve theory can be implemented. The proper materials for the core and shell are selected such that the core and the shell react to changing temperatures causing a separation and/or deformation between the shell and the core. As a result, a component that is sealed within the device using the thermal valve with the shell and core can be released into another area.

Figure 14A:
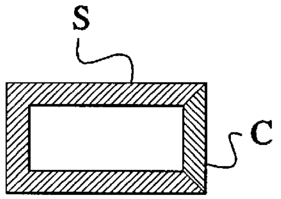
FIGS. 14(A)–14(I) illustrate alternate views of embodiments of controllable release devices.
Figure 14B:
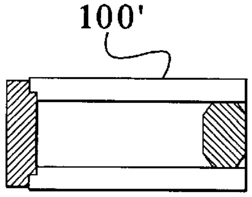
Figure 14C:
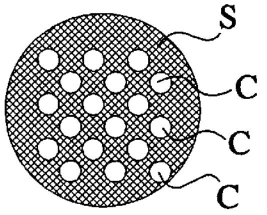
Figure 14D:
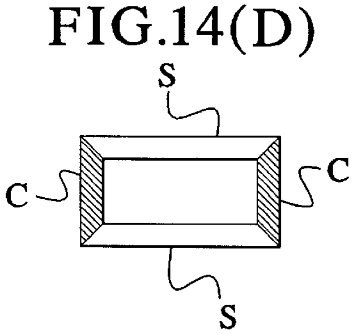
Figure 14E:
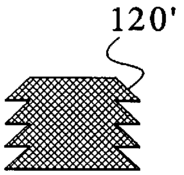
Figure 14F:
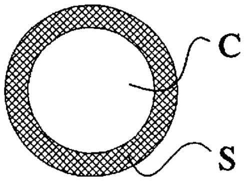
Figure 14G:
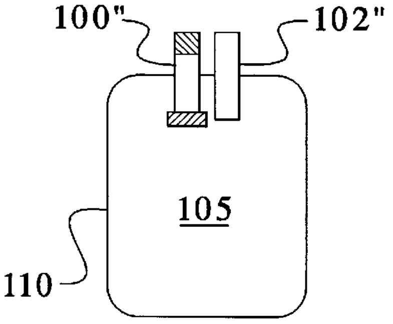
Figure 14H:
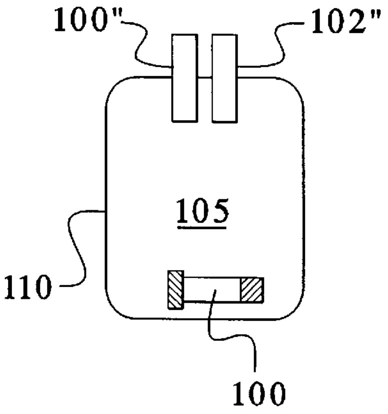
Figure 14I:
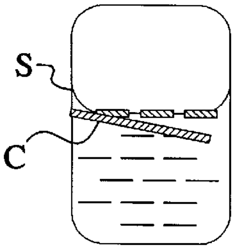

In FIGS. 14(B), 14(G) and 14(H), various alternate embodiments of a device 100', 100" and 100'", respectively, implementing the hydrostatic valve principle are shown. FIG. 14(E) illustrates an alternated design of a plug member 120'. FIG. 14(G) illustrates an embodiment in which the device 100" of the present invention replaces one port 102" of a plurality of ports that provide fluid communication with an interior 105 of a container 110.

Although the present invention has been described with respect to mixing of drug solutions, the present invention may also be implemented for application in the food and beverage industry. Often, instant food and beverages require a heating process before eating or drinking, and some food ingredients or beverage additives cannot be heated together to avoid spoiling the taste. Instead of inconvenient and time-consuming separate mixing, separate products may be placed in the device 12 of the present invention with a thermal or hydrostatic valve within the device and within the container and, after heating, the customer will receive a ready-to-eat food or drink.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A system for controlling a release of a component into an interior of a container for admixing the component with a product contained within the container, the system comprising:

a container comprising walls defining an interior for accommodating a product at a first pressure and a tubular device, the tubular device floating in the container and comprising first and second opposing and open ends, the first opposing end frictionally accommodating a cap, the device further frictionally accommodating a first plug member between the cap and the second opposing end, the cap, the first plug member and a portion of the device disposed between the cap and the first plug member defining an enclosed interior for accommodating a component at a second pressure, the first plug member migrating longitudinally towards that cap upon an increase in the first pressure of the interior of the container thereby resulting in a corresponding increase in the second pressure of the interior of the tubular device, the first plug member further frictionally engaging the device so that an increase in the second pressure in the interior of the device does not cause the first plug member to migrate towards the second end of the device.

2. The system of claim 1 further comprising a second plug member disposed between the second end of the device and the first plug member, the second plug member migrating longitudinally towards that first plug member upon an increase in the first pressure of the interior of the container.

3. The system of claim 1 wherein the component is a buffer used in a dialysis procedure.

4. The system of claim 1 wherein the product is a solution including dextrose.

5. A system for controlling a release of a component into an interior of a container for admixing the component with a product contained within the container, the system comprising:

a container comprising walls defining an interior for accommodating a product at a first temperature and a tubular device, the tubular device floating in the container and comprising first open end, the first end frictionally accommodating a cap, the device and cap defining an enclosed interior for accommodating a component, the cap comprising an outer peripheral shell which engages the device and an inner core which engages the shell, the shell being fabricated from a first material having a first melting temperature, the core being fabricated from a second material having a second melting temperature, the second melting temperature being less than the first melting temperature thereby causing a gap to be formed between the shell and the core upon heating of the cap to a sterilization temperature less than the first melting temperature and greater than the second melting temperature followed by cooling the cap to a storage temperature less than the second melting temperature.

6. The method of claim 5 wherein the agent is a buffer requiring mixture with the product for use in a dialysis procedure.

7. The method of claim 5 wherein the product is a solution having dextrose therein.

8. The method of claim 5 wherein the temperature is increased to subject the container to sterilization.

9. A method for controlling release of an agent into an interior of a container containing a product, the method comprising the steps of:

providing a container having an enclosed interior for containing the product therein at a first pressure and a tubular device;

providing an agent sealed in a tubular device that floats in the container and comprises first and second opposing and open ends, the first opposing end frictionally accommodating a cap, the device further frictionally accommodating a first plug member between the cap and the second opposing end, the cap, the first plug member and a portion of the device disposed between the cap and the first plug member defining an enclosed interior for accommodating the agent at a second pressure;

increasing the first pressure in the container thereby causing the first plug member to migrate longitudinally towards the cap thereby resulting in a corresponding increase in the second pressure of the interior of the tubular device, the first plug member further frictionally engaging the device so that an increase in the second pressure in the interior of the device does not cause the first plug member to migrate towards the second end of the device;

reducing the first pressure in the container thereby causing the cap to dislodge from the first end of the device and the release of the agent into the product.

10. A method for controlling release of an agent into an interior of a container containing a product, the method comprising the steps of:

providing a container having an enclosed interior for containing the product therein at a first temperature and a tubular device;

providing an agent sealed in a tubular device that floats in the container and comprises first open end, the first end frictionally accommodating a cap, the device and the cap defining an enclosed interior for accommodating a component, the cap comprising an outer peripheral shell which engages the device and an inner core that engages the shell, the shell being fabricated from a first material having a first melting temperature, the core being fabricated from a second material having a second melting temperature, the second melting temperature being less than the first melting temperature thereby causing a gap to be formed between the shell and the core upon heating of the cap to a sterilization temperature less than the first melting temperature and greater than the second melting temperature followed by cooling the cap to a storage temperature less than the second melting temperature, heating the container, device and cap to the sterilization temperature, cooling the container, device and cap to the storage temperature.

11. A device for controlling a release of an agent into a system, the device comprising:

a tubular member comprising first and second opposing and open ends, the first opposing end frictionally accommodating a cap, the tubular member further frictionally accommodating a first plug member between the cap and the second opposing end, the cap, first plug member and a portion of the device disposed between the cap and the first plug member defining an enclosed interior for accommodating the agent at a pressure, the first plug member migrating longitudinally towards that cap upon an increase in an ambient pressure thereby resulting in a corresponding increase in the pressure of the interior of the tubular member and dislodgement of the cap from the first end of the tubular member thereby releasing the agent from the tubular member, the first plug member further frictionally engaging the device so that an increase in the pressure in the interior of the tubular member does not cause the first plug member to migrate towards the second end of the tubular member.

12. The device of claim 11 further comprising a second plug member disposed between the second end of the device and the first plug member, the second plug member migrating longitudinally towards that first plug member upon an increase in the ambient pressure.

13. A device for controlling a release of an agent into a system, the device comprising:

a tubular member comprising first open end, the first end frictionally accommodating a cap, the device and cap defining an enclosed interior for accommodating an agent, the cap comprising an outer peripheral shell which engages the device and an inner core that engages the shell, the shell being fabricated from a first material having a first melting temperature, the core being fabricated from a second material having a second melting temperature, the second melting temperature being less than the first melting temperature thereby causing a gap to be formed between the shell and the core upon heating of the cap to a sterilization temperature less than the first melting temperature and greater than the second melting temperature followed by cooling the cap to a storage temperature less than the second melting temperature.

* * * * *